(12) United States Patent
Liu

(10) Patent No.: US 11,647,879 B2
(45) Date of Patent: May 16, 2023

(54) MULTIFUNCTIONAL EMERGENCY STARTING POWER FOR MOTOR VEHICLES

(71) Applicant: SHENZHEN CHIC ELECTRICS CO. LTD., Shenzhen (CN)

(72) Inventor: Xinhua Liu, Shenzhen (CN)

(73) Assignee: SHENZHEN CHIC ELECTRICS CO. LTD., Shenzhen (CN)

( * ) Notice: Subject to any disclaimer, the term of this patent is extended or adjusted under 35 U.S.C. 154(b) by 427 days.

(21) Appl. No.: 16/764,835

(22) PCT Filed: Apr. 23, 2020

(86) PCT No.: PCT/CN2020/086423
§ 371 (c)(1),
(2) Date: May 15, 2020

(87) PCT Pub. No.: WO2021/203490
PCT Pub. Date: Oct. 14, 2021

(65) Prior Publication Data
US 2022/0110494 A1    Apr. 14, 2022

(30) Foreign Application Priority Data

Apr. 10, 2020   (CN) .......................... 202010281291.1
Apr. 10, 2020   (CN) .......................... 202020532989.1

(51) Int. Cl.
*A47L 7/00*        (2006.01)
*A47L 9/28*        (2006.01)
*B60R 16/03*       (2006.01)
*H02J 7/00*        (2006.01)

(52) U.S. Cl.
CPC ........... *A47L 7/0085* (2013.01); *A47L 7/0076* (2013.01); *A47L 9/2884* (2013.01); *B60R 16/03* (2013.01); *H02J 7/0044* (2013.01); *A47L 2201/022* (2013.01)

(58) Field of Classification Search
CPC ....... A47L 7/0085; H02J 7/0044; B60R 16/03
USPC ........................................................ 15/339
See application file for complete search history.

(56) References Cited

U.S. PATENT DOCUMENTS

| | | | | |
|---|---|---|---|---|
| 2015/0340907 | A1* | 11/2015 | Lei | H02J 9/04 307/66 |
| 2020/0295575 | A1* | 9/2020 | Nook | H02J 7/0042 |
| 2021/0101503 | A1* | 4/2021 | Windsor | H02J 7/00712 |

* cited by examiner

*Primary Examiner* — Suchin Parihar
(74) *Attorney, Agent, or Firm* — Li & Cai Intellectual Property (USA) Office

(57) ABSTRACT

A multifunctional emergency starting power for motor vehicles is provided, including a bracket (10), an accumulator (20) mounted on the bracket (10), a first interface (50) for charging the accumulator (20), and a second interface (30) for outputting an emergency starting voltage to a motor vehicle. The bracket (10) is also installed with a vacuum cleaner (70) and a controller (60) for controlling the operation of the vacuum cleaner and the charging of the accumulator. The accumulator is respectively connected to the vacuum cleaner and the controller and supplies an electrical energy thereto. The emergency starting power and the vacuuming function are integrated, and the battery of the emergency starting power is configured for powering the vacuum cleaner and the controller of the emergency starting power is configured for controlling the power charging and the vacuum cleaner work.

9 Claims, 12 Drawing Sheets

MULTIFUNCTIONAL EMERGENCY STARTING POWER FOR MOTOR VEHICLES

FIELD OF THE DISCLOSURE

The present disclosure relates to an emergency starting power for motor vehicles, in particular, to a multifunctional emergency starting power for motor vehicles.

BACKGROUND OF THE DISCLOSURE

With the improvement of living standards, there are more and more private cars. When the motor vehicle is idle for a long time, the power of the on-board battery will be exhausted, resulting in the failure to start the vehicle normally, and the need to call for rescue. To this end, people have designed an emergency starting power for motor vehicles. The power supply is connected to the two electrodes of the on-board battery through a special wiring clamp, then the electricity is ignited, and the vehicle can be easily started. In addition, people have also developed some small vacuum cleaners for vehicles, which greatly facilitate the owners to clean the debris in the cabin.

Although the emergence of emergency starting power, car vacuum cleaner and other tools provides convenience for car owners, each tool has only one function, and many other tools need to be purchased individually, which is not only expensive to purchase, but also unfavorable for storage.

SUMMARY OF THE DISCLOSURE

The purpose of the present disclosure is to provide a multifunctional emergency starting power for motor vehicles, so as to solve the above-mentioned shortcomings of the related art at least to a certain extent.

In order to achieve the above purpose, the technical solutions adopted by the present disclosure are as follows.

A multifunctional emergency starting power for motor vehicles is provided, comprising: a bracket (10), an accumulator (20) mounted on the bracket (10), a first interface (50) for charging the accumulator (20), and a second interface (30) for outputting an emergency starting voltage to a motor vehicle; wherein the bracket (10) is also installed with a vacuum cleaner (70) and a controller (60) for controlling the operation of the vacuum cleaner (70) and the charging of the accumulator (20), and the accumulator (20) is respectively connected to the vacuum cleaner (70) and the controller (60) and supplies an electrical energy thereto.

In a preferred embodiment, the controller (60) comprises: a voltage boosting unit (602) connected between the first interface (50) and the accumulator (20); a driving unit (607) connected between the accumulator (20) and the vacuum cleaner (70); a first control chip (609) for providing a PWM control signal to the voltage boosting unit (602) and the driving unit (607); a power detection unit (601) connected between an input terminal of the first control chip (609) and the first interface (50), and configured for detecting whether power is connected; and an input terminal connected to the first control chip (609), and configure for controlling a control switch (80) of the vacuum cleaner (70).

In a preferred embodiment, the accumulator (20) is a battery pack composed of a plurality of single cells, and the controller (60) further comprises: a power switch tube (603) connected in series in a charging circuit of the battery pack; and a second control chip (604), wherein the second control chip (604) is connected to the plurality of single cells, and is connected to a control end of the power switch tube (603) to detect voltage of each single cell and control on/off of the power switch tube (603).

In a preferred embodiment, the multifunctional emergency starting power for motor vehicles further comprises: a third interface (40) for powering or charging an external electrical appliance, the controller (60) further comprises a voltage reduction unit (605) connected between the accumulator (20) and the third interface (40), and the first control chip (609) is also configured for providing a control signal to the voltage reduction unit (605).

In a preferred embodiment, the third interface (40) is a USB interface, and is also connected to a third control chip (606) for reading a port protocol of the external electrical appliance connected to the third interface (40) and adjusting electrical characteristics of the third interface (40).

In a preferred embodiment, the third control chip (606) adopts the RZC7514 chip, the DM pin and the DP pin of the RZC7514 chip are connected to the D+ pin and the D− pin of the third interface (40), the SEL pin of the RZC7514 chip is connected to the power pins of the third interface (40) through a resistor R13, and the power pins and ground pins of the RZC7514 chip are connected to the power pins and ground pins of the third interface (40).

In a preferred embodiment, the bracket (10) is a cylindrical structure, the vacuum cleaner (70) is installed at a first end of the cylindrical structure, and the first interface (50) and the second interface (30) are installed at a second end of the cylindrical structure; the vacuum cleaner (70) comprises a back shell (72), an exhaust fan (71) and a head (73), wherein the back shell (72) is installed at a first end the cylindrical structure, the exhaust fan (71) is installed in the cylindrical structure, the head (73) is detachably assembled to the back shell (72), the back shell (72) has a mesh-shaped hole, and a suction port of the exhaust fan (71) communicates with the mesh-shaped hole.

In a preferred embodiment, the cylindrical structure comprises a soft outer cylinder (11), an integrated middle cylinder (12), and an inner cylinder (13) composed of a combination of two cylinder petals; the accumulator (20) and the controller (60) are installed inside the inner cylinder (13), the middle cylinder (12) is sleeved outside the inner cylinder (13), and the outer cylinder (11) is sleeved outside the middle cylinder (12) and adjacent to the second end of the cylindrical structure.

In a preferred embodiment, the outer cylinder (11) comprises an annular base (111), two opposing tile-shaped portions (112) extending from one end of the annular base (111) along the axis of the annular base (111), and a sealing sheet (113) located between the two tile-shaped portions (112), and configured for sealing the control switch (80) and an indicator light (90).

In a preferred embodiment, a first end cover (15) for protecting the vacuum cleaner (70) is installed at a first end of the bracket (10), and a second end cover (14) for protecting each interface is installed at a second end of the bracket (10).

Compared with the prior art, the present disclosure has at least the following beneficial effects.

The multifunctional emergency starting power for motor vehicles and the vacuuming function are integrated, and the battery of the emergency starting power is configured for powering the vacuum cleaner and the controller of the emergency starting power is configured for controlling the power supply charging and the vacuum cleaner work, thereby effectively reducing the components so as to provide the characteristics of low cost and small occupied space.

The multifunctional emergency starting power for motor vehicles further integrates a power supply function, which can charge or supply power to other devices such as mobile phones, and can be used as a charge bank when the user drives out.

The bracket adopts a cylindrical structure, which is convenient for vacuuming in a small space.

Figure 1:
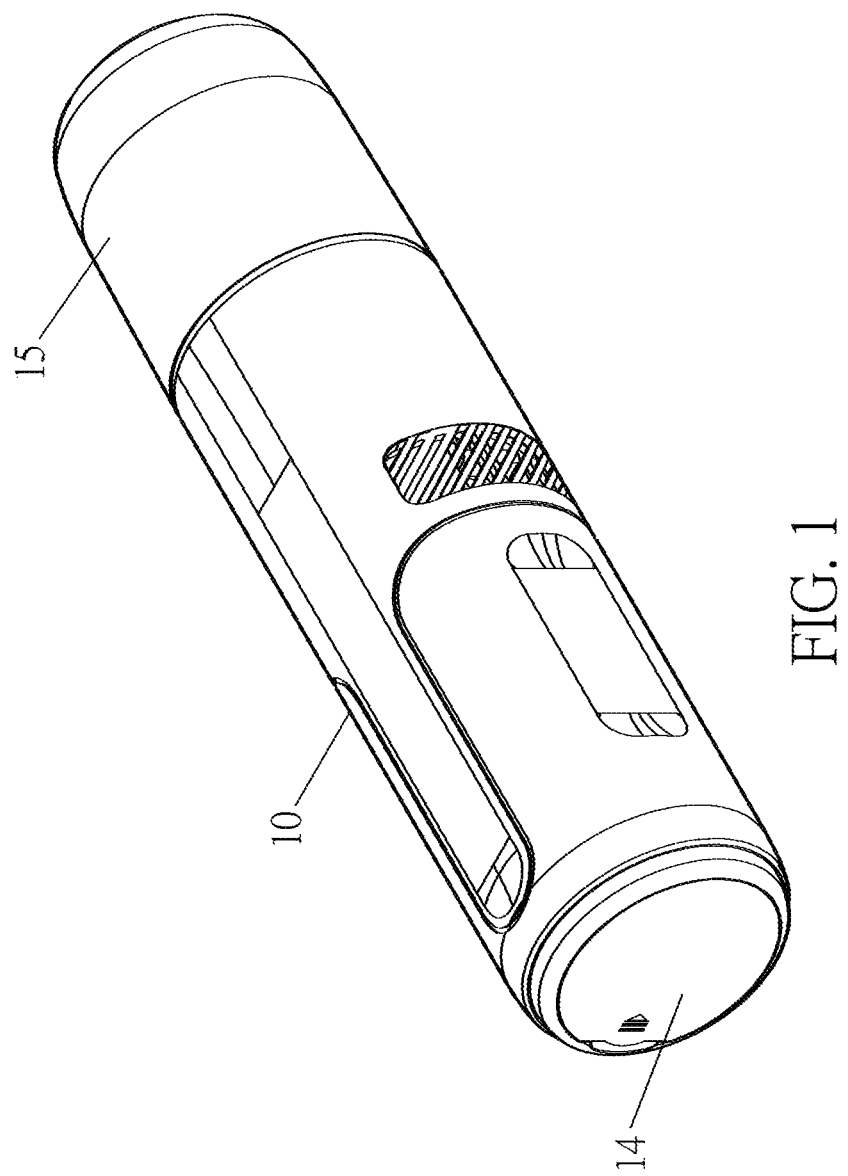
FIG. 1 is a schematic view of the overall structure of an embodiment of a multifunctional emergency starting power for motor vehicles.
Figure 2:
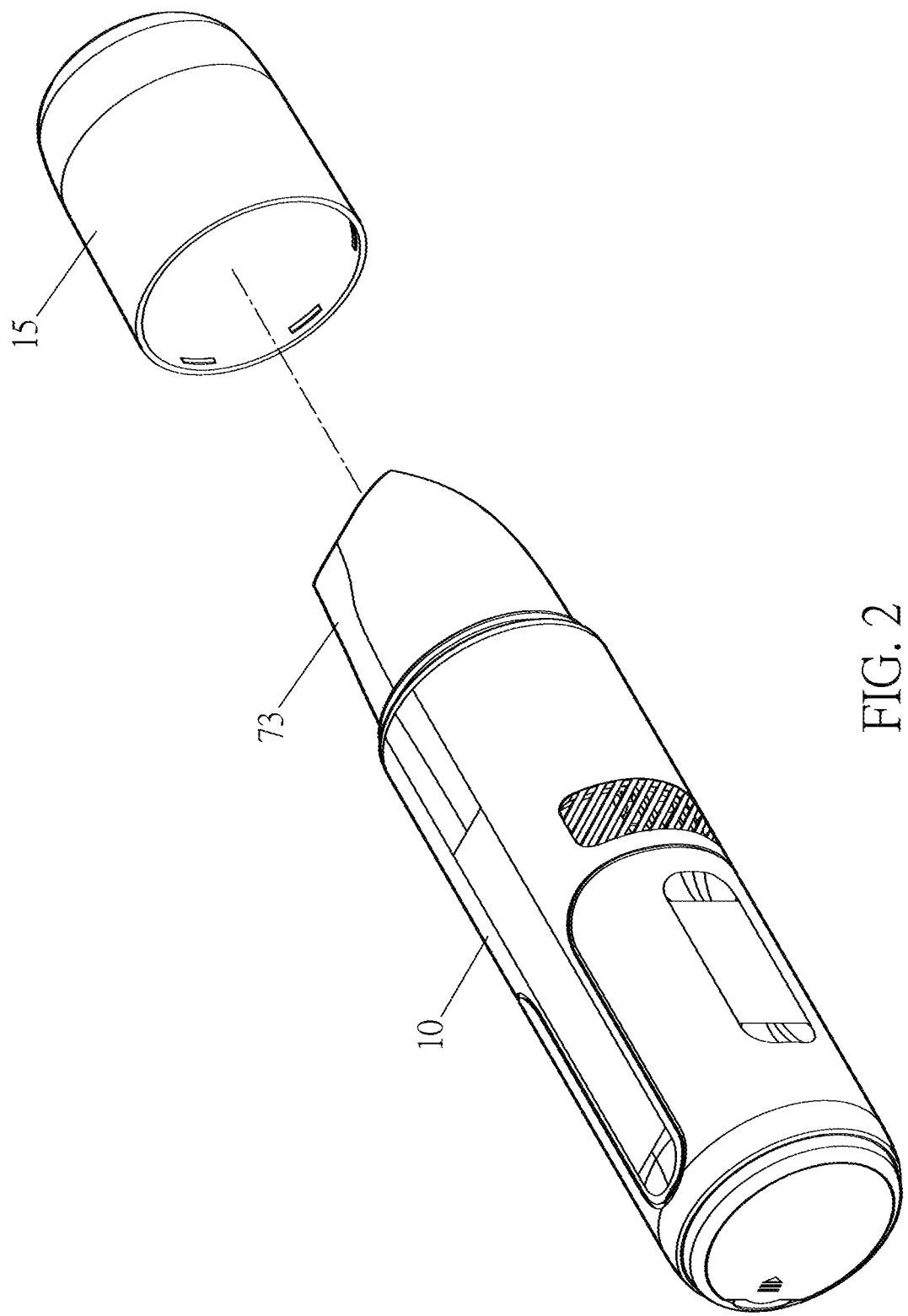
FIG. 2 is a schematic view of the state after the first end cover is opened.
Figure 3:
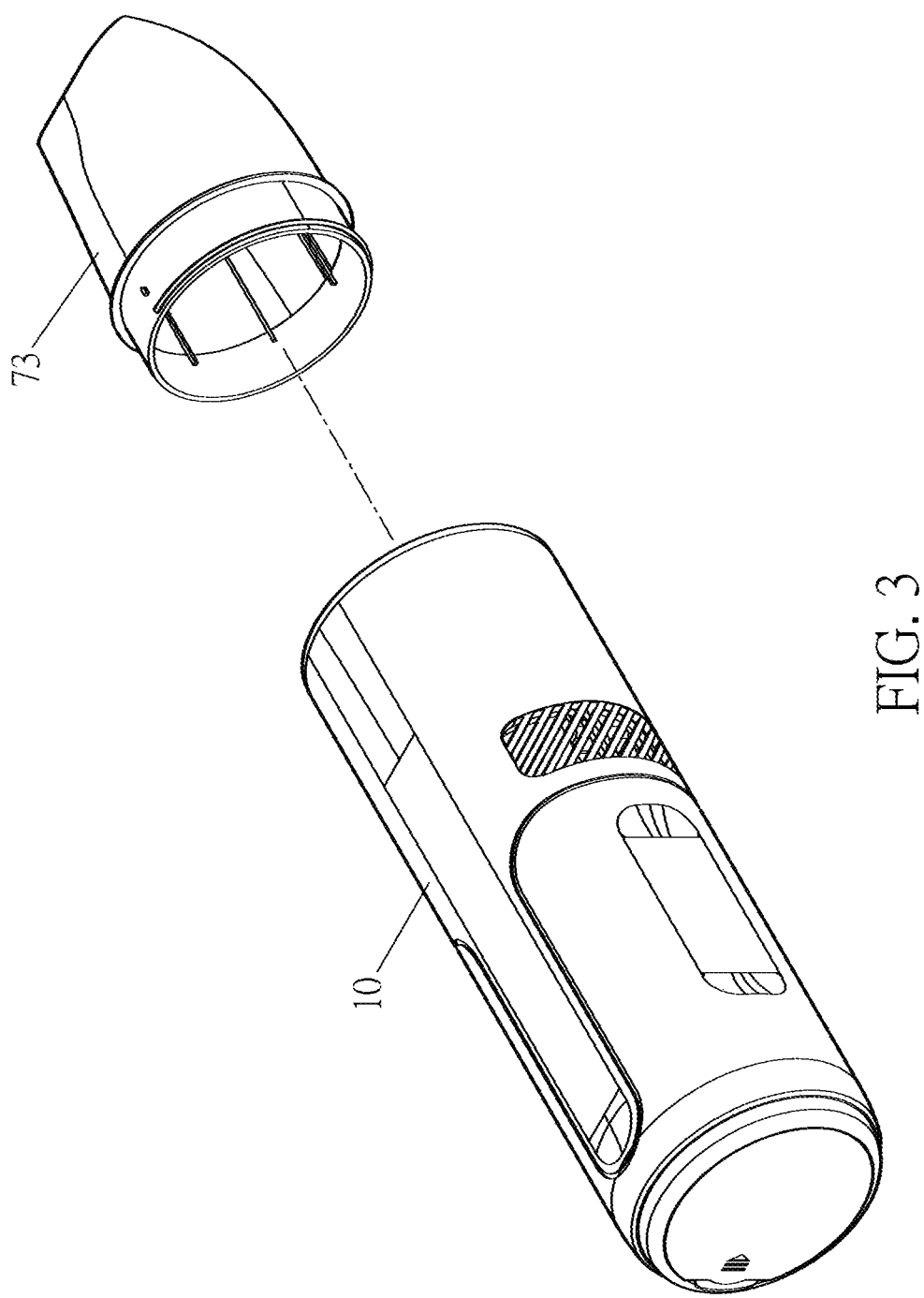
FIG. 3 is a schematic diagram of the state after the head of the vacuum cleaner is removed.
Figure 4:
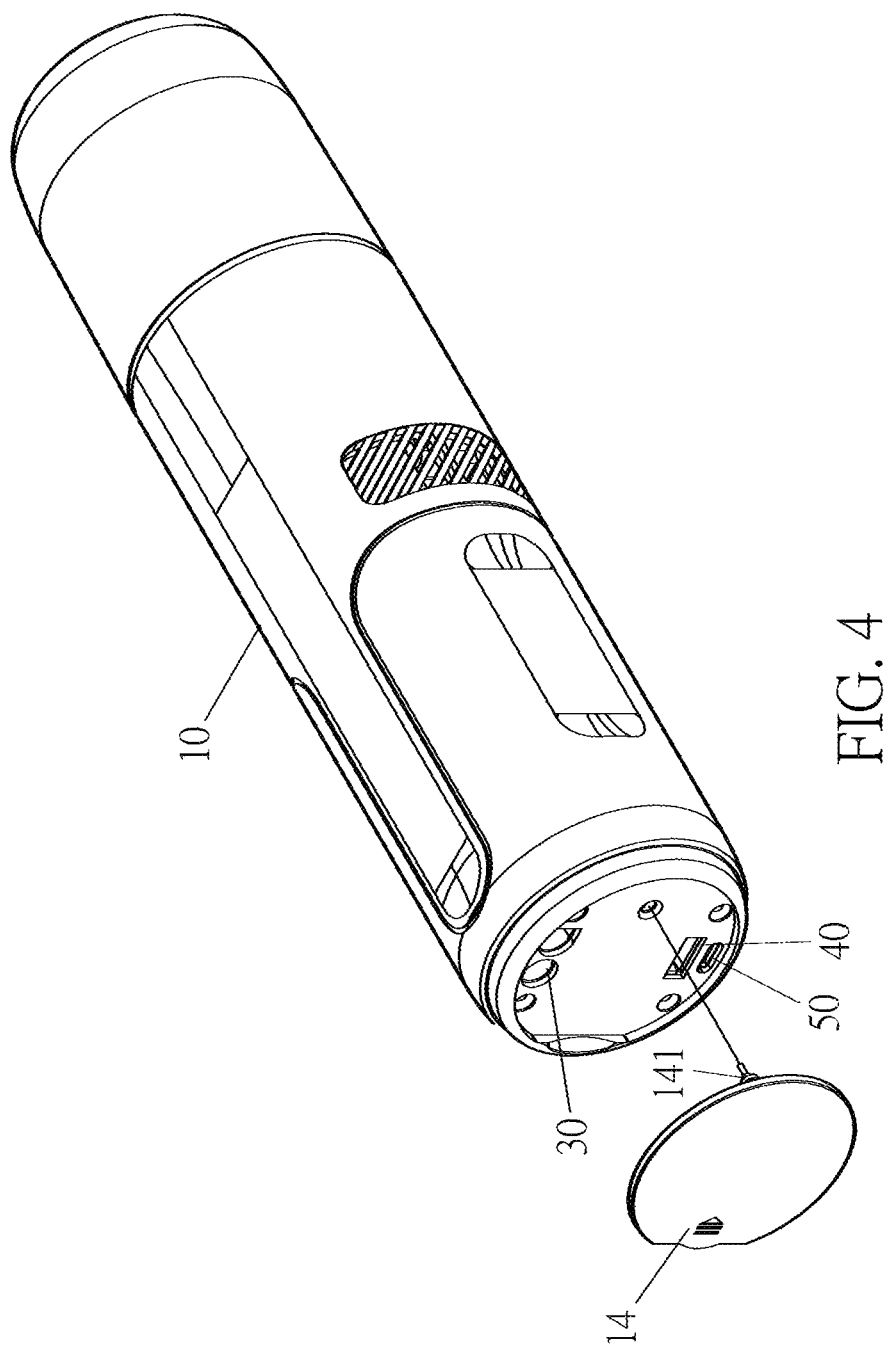
FIG. 4 is a schematic diagram of the state after the second end cover is removed.

Reference numeral: 10. bracket; 11. outer cylinder; 111. annular base; 112. tile-shaped portion; 113. sealing sheet; 12. middle cylinder; 13. inner cylinder; 14. second end cover; 141. glue nail; 15. first end cover; 20. accumulator; 30. second interface; 40. third interface; 50. first interface; 60. controller; 70. vacuum cleaner; 71. exhaust fan; 72. back shell; 73. head; 80. control switch; 90. indicator light; 601. power detection unit; 602. voltage boosting unit; 603. power switch tube; 604. second control chip; 605. voltage reduction unit; 606. third control chip; 607. driving unit; 608. DC-DC converter; 609. first control chip.

Detailed Description of the Exemplary Embodiments

The present disclosure will be further described below with reference to the drawings and embodiments.

Referring to FIG. 1 to FIG. 6, a multifunctional emergency starting power for motor vehicles of the present disclosure includes: a bracket 10, an accumulator 20, a vacuum cleaner 70, a first interface 50 for charging the accumulator 20, and a second interface 30 for outputting an emergency starting voltage to a motor vehicle and a controller 60 for controlling the operation of the vacuum cleaner 70 and the charging of the accumulator 20. It further includes a third interface 40 for powering or charging an external electrical appliance (such as mobile phones). The controller 60 and the vacuum cleaner 70 are powered by the accumulator 20.

The bracket 10 is configured for combining the accumulator 20, the vacuum cleaner 70, the controller 60, the first interface 50, the second interface 30, and the third interface 40.

Specifically, in the embodiment, the bracket 10 has a cylindrical structure, the vacuum cleaner 70 is installed at a first end of the cylindrical structure, and the first interface 50, the second interface 30, and the third interface 40 are installed at a second end of the cylindrical structure. The use of the cylindrical structure of the bracket makes it easy to vacuum in a small space such as the seat bottom. In addition, the vacuum cleaner 70 includes a back shell 72, an exhaust fan 71 and a head 73. The back shell 72 is fixedly installed at a first end of the cylindrical structure, the exhaust fan 71 is fixedly installed in the cylindrical structure, the head 73 is screwed to the back shell 72, the back shell 72 has a mesh-shaped hole, and a suction port of the exhaust fan 71 communicates with the mesh-shaped hole. When the exhaust fan 71 operates, a negative pressure is formed in the chamber between the back shell 72 and the head 73, so that debris or the like is sucked into the chamber from the opening in the head 73. After vacuuming, the debris in the chamber can be expelled easily by unscrewing the head 73, which is very convenient to use.

Figure 5:
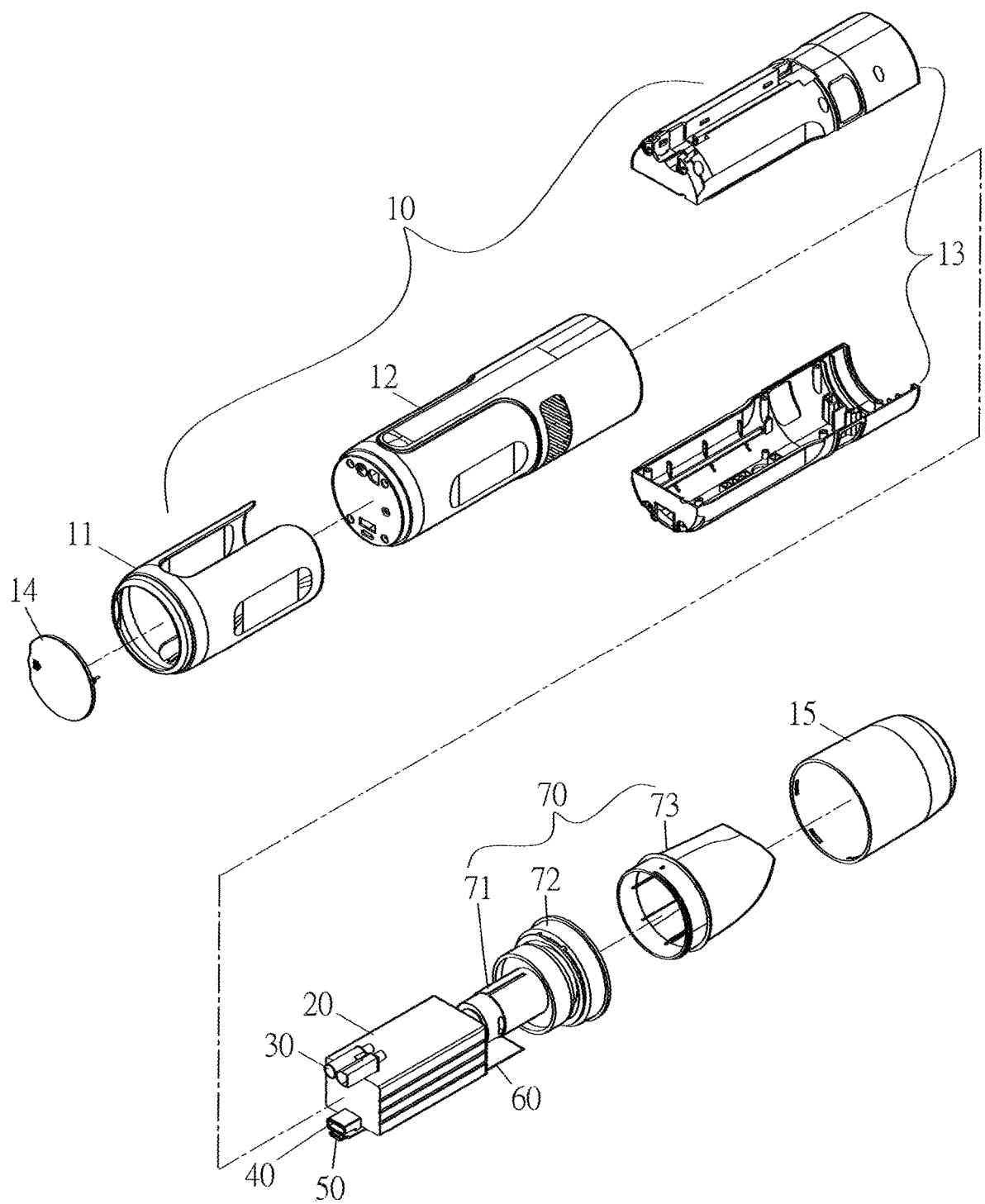
FIG. 5 is an exploded view.
Figure 6:
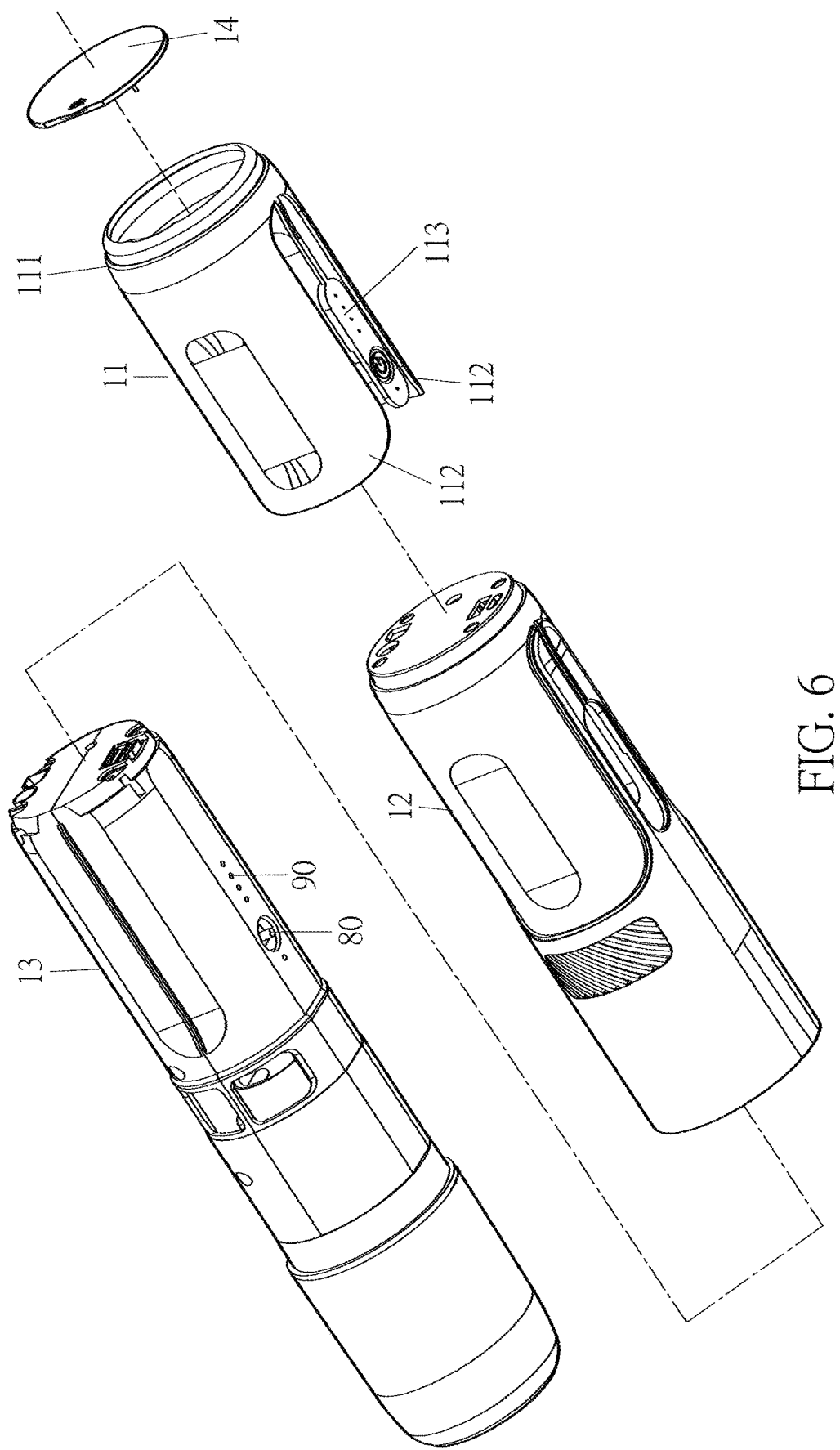
FIG. 6 is an assembly diagram of the outer cylinder, the middle cylinder and the inner cylinder.

Further, the cylindrical structure of the bracket 10 includes a soft outer cylinder 11, an integrated middle cylinder 12, and an inner cylinder 13 composed of a combination of two cylinder petals. The accumulator 20 and the controller 60 are installed inside the inner cylinder 13, the middle cylinder 12 is sleeved outside the inner cylinder 13, and the outer cylinder 11 is sleeved outside the middle cylinder 12 and adjacent to the second end of the cylindrical structure. The middle cylinder 12 plays a role of assembling and fixing the inner cylinder 13, and the outer cylinder 11 plays a role of preventing falling, increasing friction with a human hand, and making the grip comfortable. As shown in FIGS. 5 and 6, when assembling, the controller 60, the accumulator 20 and the vacuum cleaner 70 are installed to the inner cylinder 13, the middle cylinder 12 is sleeved outside the inner cylinder 13, and then the outer cylinder 11 is sleeved outside the middle tube 12.

Referring to FIG. 6, the outer cylinder 11 further includes an annular base 111, two opposing tile-shaped portions 112 extending from one end of the annular base 111 along the axis of the annular base 111, and a sealing sheet 113 located between the two tile-shaped portions 112, and configured for sealing the control switch 80 and an indicator light 90. The outer cylinder 11 is provided with a sealing sheet 113, which can prevent water from entering the control switch 80 and the indicator light 90.

Further, a first end cover 15 is screwed to a first end of the bracket 10, and the first end cover 15 encloses the head 73 of the vacuum cleaner 70 to protect the vacuum cleaner 70. A second end cover 14 is also installed at a second end of the bracket 10. After the second end cover 14 is opened, each interface is exposed for operation. When the second end cover 14 is closed, each interface is covered to protect the interface. The second end cover 14 is connected to the bracket 10 through a glue nail 141 provided thereon. When the second end cover 14 is opened from the bracket 10, the second end cover 14 will not fall, which can prevent the second end cover 14 from being lost.

Figure 7:
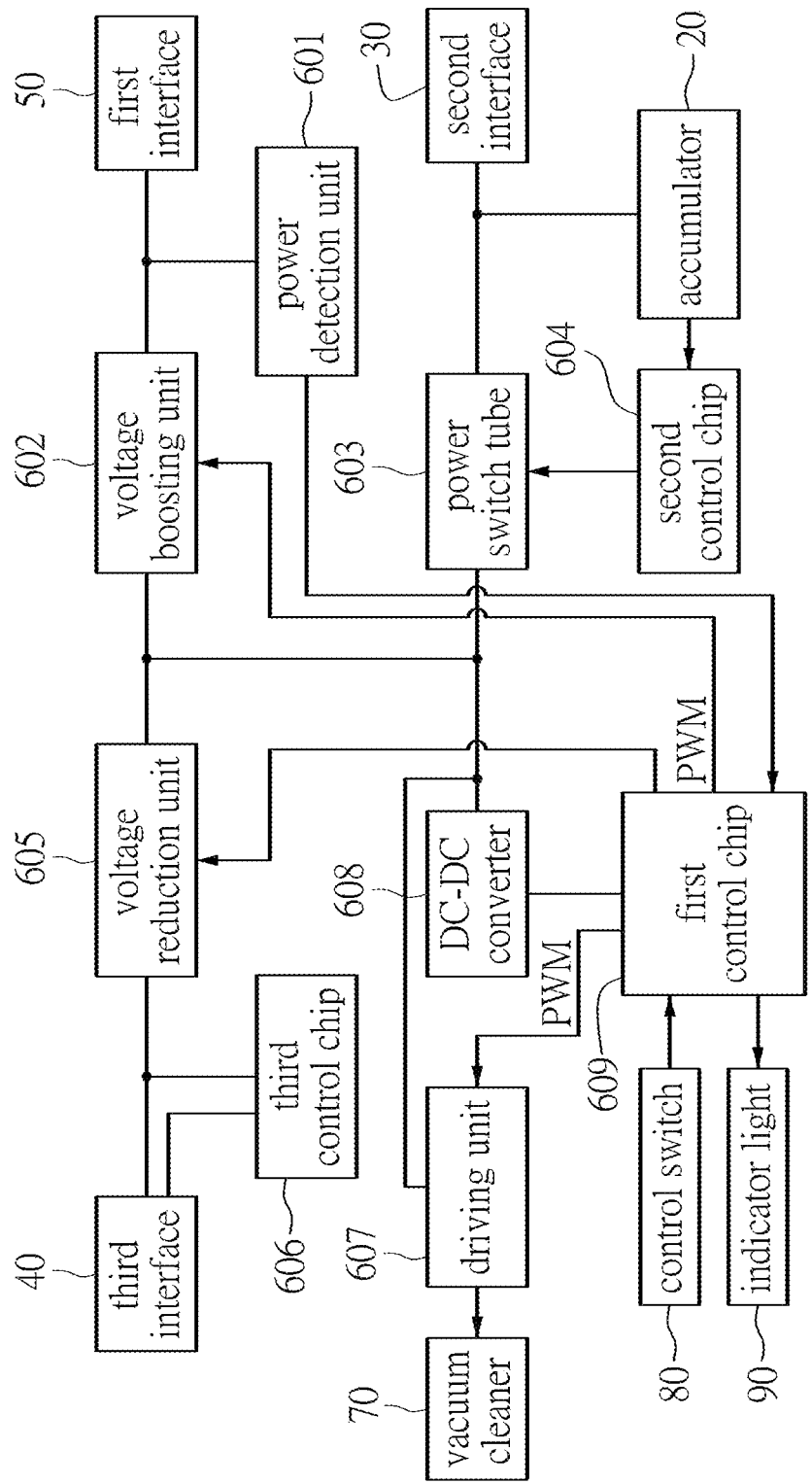
FIG. 7 is a block diagram of the controller.

The composition of the controller 60 is shown in FIG. 7. As shown in FIG. 7, the controller 60 includes: a voltage boosting unit 602 connected between the first interface 50 and the accumulator 20, a first control chip 609 for providing a PWM control signal to the voltage boosting unit 602 and a driving unit 607, a power detection unit 601 connected between an input terminal of the first control chip 609 and the first interface 50, and configured for detecting whether power is connected, and an input terminal connected to the first control chip 609, and configured for controlling the control switch 80 of the vacuum cleaner 70. The first interface 50 is preferably a USB Type A interface, a USB Type B interface, a USB Type C interface, and more preferably a USB Type C interface. The accumulator 20 performs voltage conversion through a DC-DC converter 608, and then supplies power to the first control chip 609.

Figure 8:
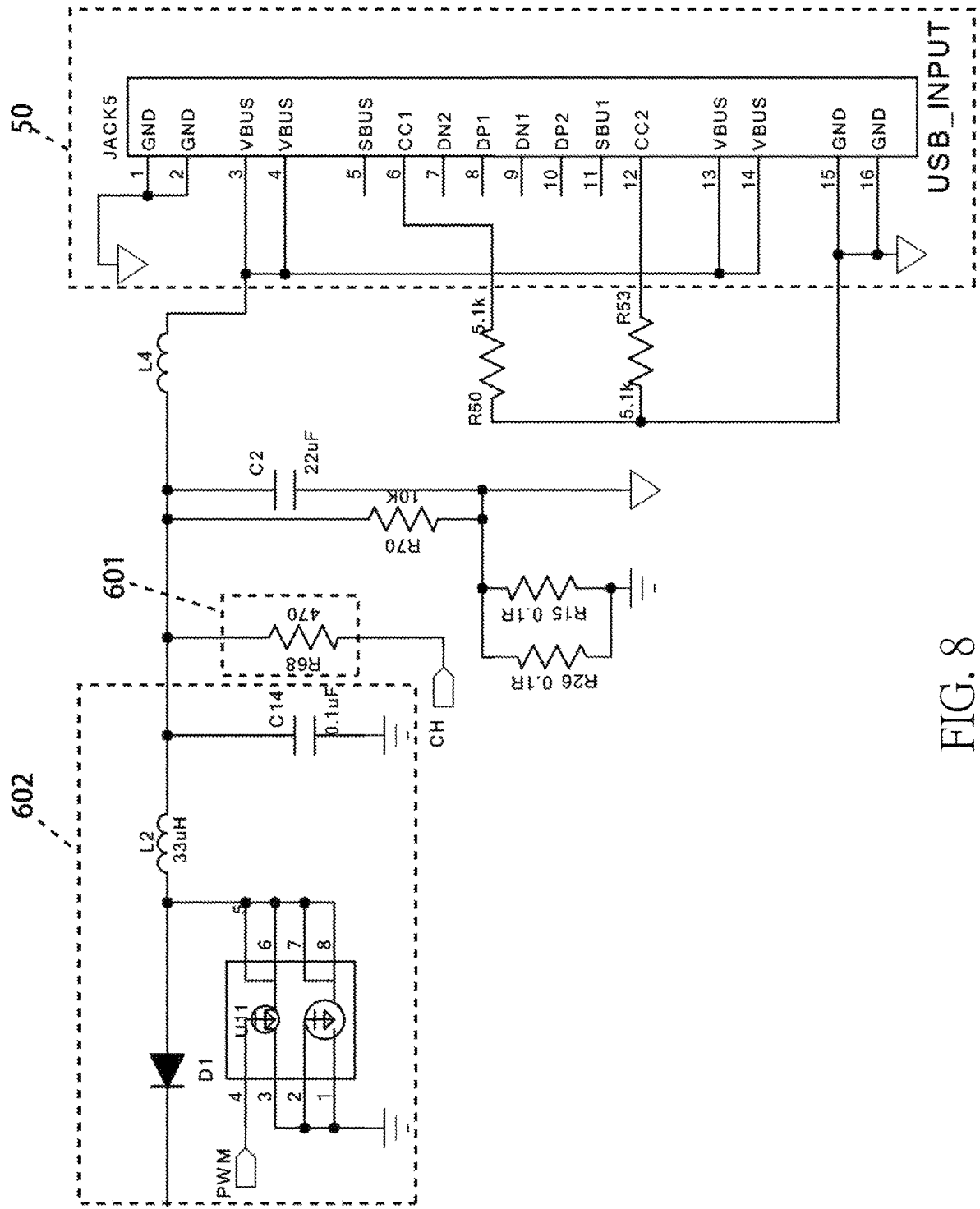
FIG. 8 is a circuit diagram of the first interface, the voltage boosting unit, and the power detection unit.

FIG. 8 shows a specific circuit of an embodiment of the first interface 50, the voltage boosting unit 602, and the power detection unit 601. The first interface 50 uses a USB Type C interface, the voltage boosting unit 602 is composed of an inductor L2, a MOS tube U11, and the like, and the power detection unit 601 uses a resistor R68.

After the power supply is connected to the first interface 50, the first control chip 609 can be identified by the power detection unit 601. At this time, the first control chip 609 outputs a PWM signal to control the voltage boosting unit 602 to boost the external power supply to charge the accumulator 20.

When the wiring clamp is connected to the second interface 30, the accumulator 20 provides an emergency starting voltage to the motor vehicle through the second interface 30 and the wiring clamp.

When the control switch 80 is pressed, the first control chip 609 outputs a PWM signal, and controls the driving unit 607 to work and drives the vacuum cleaner 70 to work.

Figure 9:
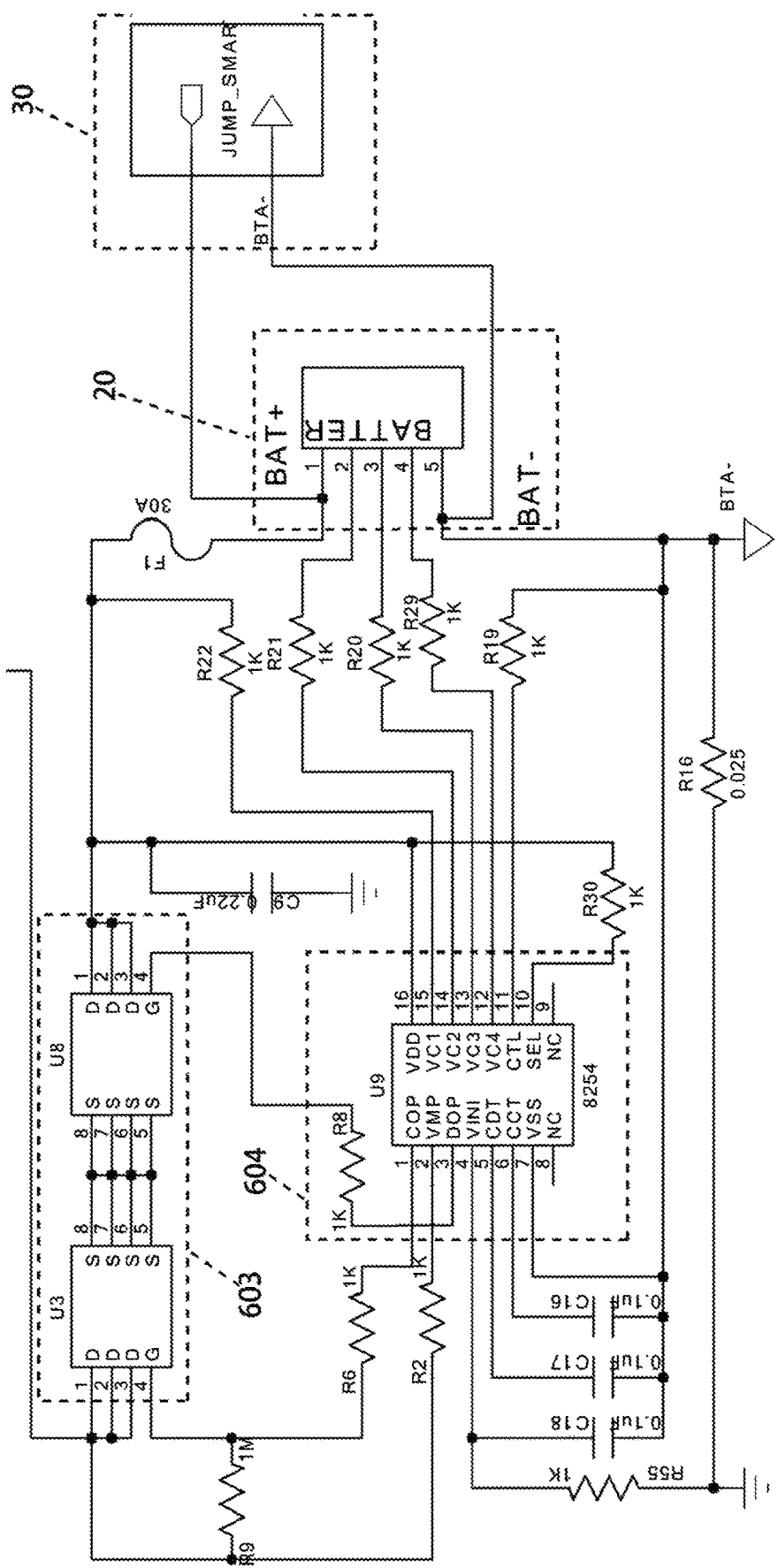
FIG. 9 is a circuit diagram of the second interface, the accumulator, the power switch tube, and the second control chip.

Further, the accumulator 20 adopts a battery pack composed of a plurality of single cells. Reference is made to FIGS. 7 and 9. The controller 60 further includes a second control chip 604 and a power switch tube 603 connected in series in a charging circuit of the battery pack (accumulator 20). The second control chip 604 is connected to the plurality of single cells and a control end of the power switch tube 603 to detect voltage of each single cell and control on/off of the power switch 603. When charging the accumulator 20, the second control chip 604 detects the voltage of each single cell. When the voltage meets the emergency starting voltage of the motor vehicle, the second control chip 604 outputs a signal to control the power switch tube 603 to be turned off to turn off to disconnect the charging circuit. It can be seen that by configuring the above-mentioned second control chip 604 and power switch tube 603, the voltage output by the second interface 30 can be controlled not to exceed the standard to avoid damage to the motor vehicle circuit caused by overvoltage.

Figure 10:
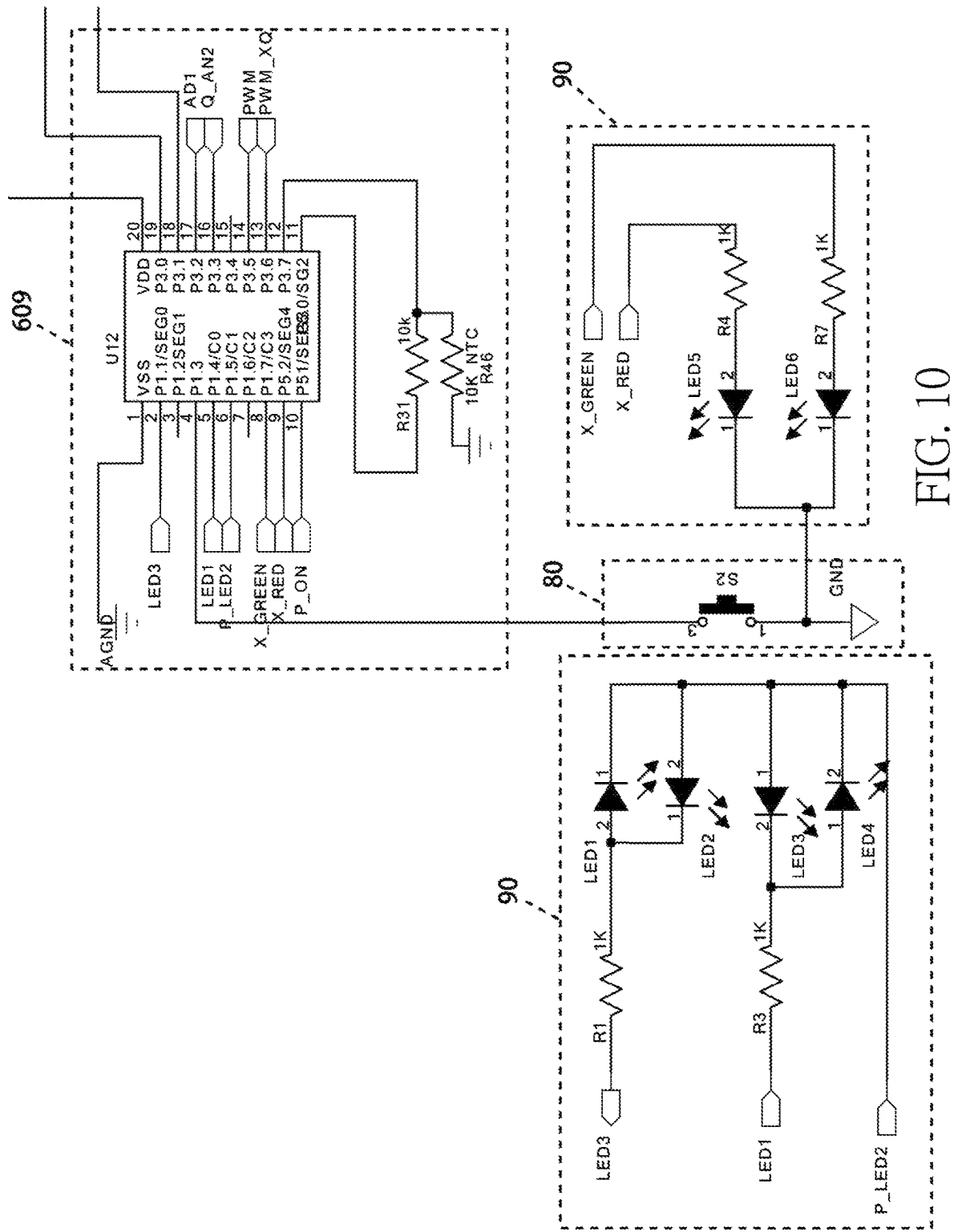
FIG. 10 is a circuit diagram of the first control chip, the control switch, and indicator light.

Referring to FIGS. 7 and 10, the controller 60 further includes an indicator light 90. The indicator light 90 includes a power indicator and a working status indicator. The power indicator is composed of LED1, LED2, LED3, and LED4, and can display the power. The working status indicator includes LED5 and LED6, and can show whether the vacuum cleaner 70, the third interface 40, the first interface 50 and the second interface 30 are working.

Figure 11:
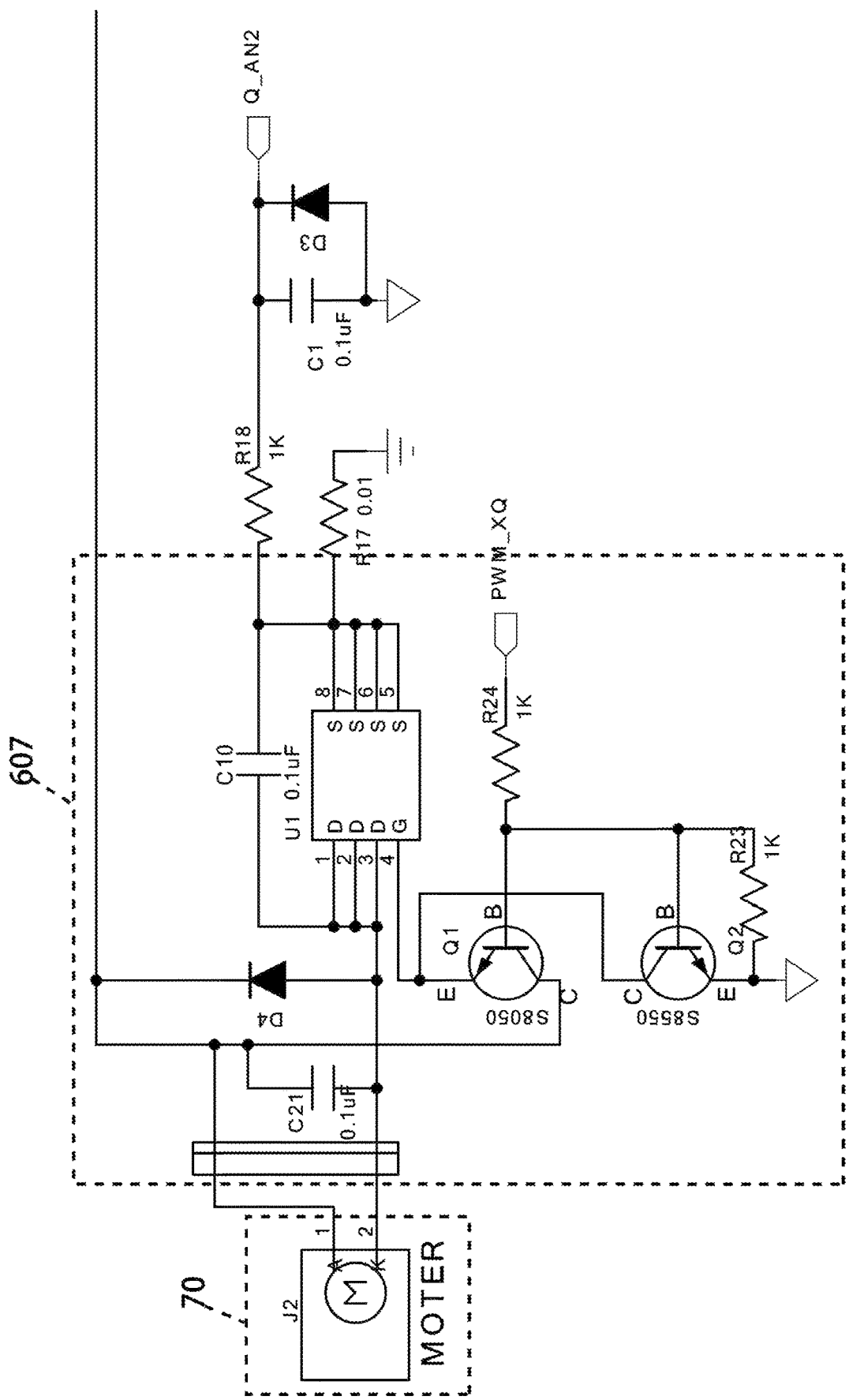
FIG. 11 is a circuit diagram of the driving unit.

Referring to FIG. 11, the driving unit 607 is configured for driving the vacuum cleaner 70. The driving unit 607 includes a power MOS tube U1 and a pre-driving unit. The pre-driving unit is composed of transistors Q1 and Q2. When the control switch 80 is pressed, the first control chip 609 outputs a PWM signal to control the pre-driving unit, thereby controlling the power MOS tube U1 to work and driving the vacuum cleaner 70 to work.

Figure 12:
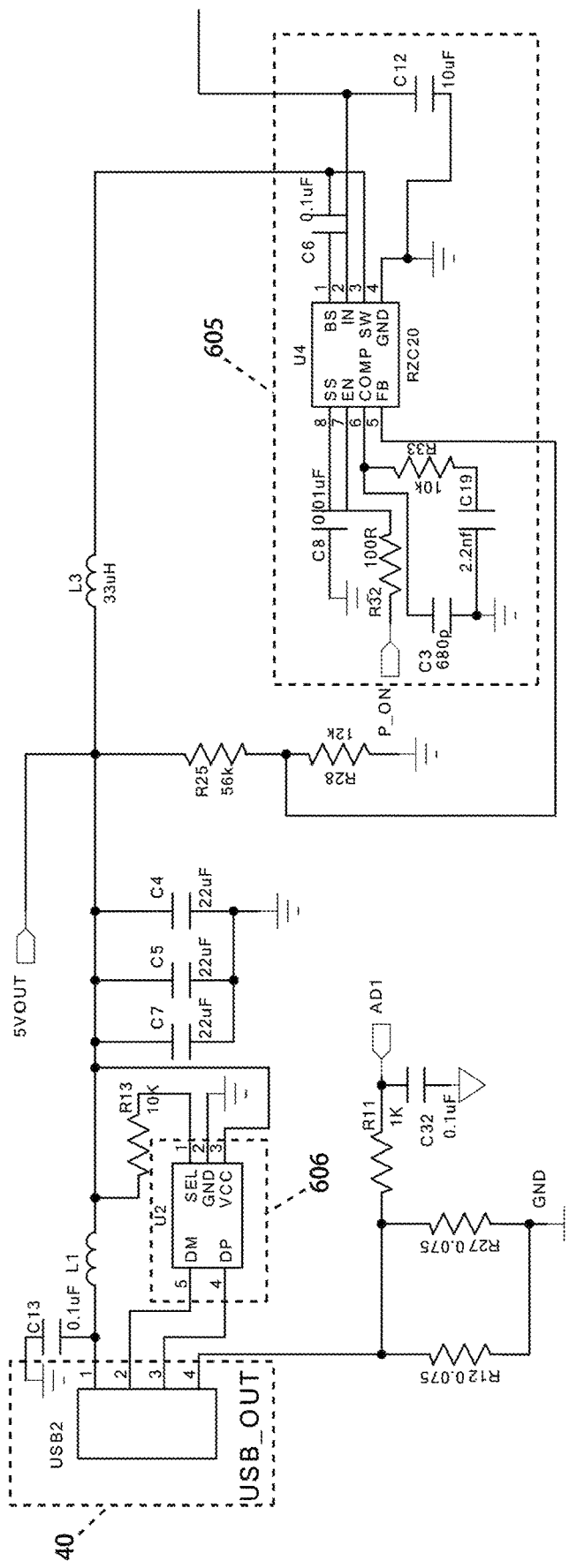
FIG. 12 is a circuit diagram of the third interface, the third control chip, and the voltage reduction unit.

Referring to FIGS. 7 and 12, the controller 60 further includes a third interface 40. The third interface 40 is connected to the accumulator 20 through a voltage reduction unit 605. The first control chip 609 is also configured for providing a control signal to the voltage reduction unit 605. In FIG. 12, the pin 2 of the chip U4 is an input terminal of the voltage reduction unit 605 and connected to the accumulator 20, and the pin 7 is a control terminal and connected to the first control chip 609. When the control switch 80 is pressed, the first control chip 609 controls the voltage reduction unit 605 to output the voltage of the accumulator 20 after being reduced to the third interface 40 to charge or supply power to other devices such as mobile phones. With further reference to FIG. 10, in the embodiment, a control switch 80 is configured for controlling the operation of the vacuum cleaner 70 and controlling the accumulator 20 to reduce voltage and supply power to the third interface 40. Different control functions can be realized by long pressing, short pressing or pressing times.

The third interface 40 is preferably a USB interface, and a third control chip 606 is further connected to the third interface 40 for reading the port protocol of the device connected to the third interface 40 and adjusting electrical characteristics of the third interface 40. Specifically, in the embodiment, the third control chip 606 uses the RZC7514 chip, the DM pin and the DP pin of the RZC7514 chip are connected to the D+ pin and the D− pin of the third interface 40, the SEL pin of the RZC7514 chip is connected to the power pins of the third interface 40 through a resistor R13, and the power pins and ground pins of the RZC7514 chip are connected to the power pins and ground pins of the third interface 40.

It can be seen that the above-mentioned multifunctional emergency starting power for motor vehicles is a multifunctional vehicle tool that integrates emergency starting, dust suction, and charging/power supply functions. Compared with a variety of vehicle tools with a single function, the embodiment has the advantages of small size, easy storage, low cost, etc. In addition, the multifunctional emergency starting power for motor vehicles also has the advantages of convenient use, convenient vacuuming in a small space, can avoid damage to the automobile circuit during emergency startup, and can identify external devices and adjust electrical characteristics of the interface.

The above-mentioned descriptions represent merely an exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. A multifunctional emergency starting power for motor vehicles, comprising: a bracket (10), an accumulator (20) mounted on the bracket (10), a first interface (50) for charging the accumulator (20), and a second interface (30) for outputting an emergency starting voltage to a motor vehicle, wherein the bracket (10) is also installed with a vacuum cleaner (70) and a controller (60) for controlling the operation of the vacuum cleaner (70) and the charging of the accumulator (20), and the accumulator (20) is respectively connected to the vacuum cleaner (70) and the controller (60) and supplies an electrical energy thereto;

wherein the bracket (10) is a cylindrical structure, the vacuum cleaner (70) is installed at a first end of the cylindrical structure, and the first interface (50) and the second interface (30) are installed at a second end of the cylindrical structure; the vacuum cleaner (70) comprises a back shell (72), an exhaust fan (71) and a head (73), wherein the back shell (72) is installed at the first end of the cylindrical structure, the exhaust fan (71) is installed in the cylindrical structure, the head (73) is detachably assembled to the back shell (72), the back shell (72) has a mesh-shaped hole, and a suction port of the exhaust fan (71) communicates with the mesh-shaped hole.

2. The multifunctional emergency starting power for motor vehicles according to claim 1, wherein the controller (60) comprises:
- a voltage boosting unit (602) connected between the first interface (50) and the accumulator (20);
- a driving unit (607) connected between the accumulator (20) and the vacuum cleaner (70);
- a first control chip (609) for providing a PWM control signal to the voltage boosting unit (602) and the driving unit (607);
- a power detection unit (601) connected between an input terminal of the first control chip (609) and the first interface (50), and configured for detecting whether power is connected, and
- an input terminal connected to the first control chip (609), and configure for controlling a control switch (80) of the vacuum cleaner (70).

3. The multifunctional emergency starting power for motor vehicles according to claim 2, wherein the accumulator (20) is a battery pack composed of a plurality of single cells, and the controller (60) further comprises:
- a power switch tube (603) connected in series in a charging circuit of the battery pack, and
- a second control chip (604), wherein the second control chip (604) is connected to the plurality of single cells, and is connected to a control end of the power switch tube (603) to detect voltage of each single cell and control on/off of the power switch tube (603).

4. The multifunctional emergency starting power for motor vehicles according to claim 2, wherein the multifunctional emergency starting power for motor vehicles further comprises: a third interface (40) for powering or charging an external electrical appliance, the controller (60) further comprises a voltage reduction unit (605) connected between the accumulator (20) and the third interface (40), and the first control chip (609) is also configured for providing a control signal to the voltage reduction unit (605).

5. The multifunctional emergency starting power for motor vehicles according to claim 4, wherein the third interface (40) is a USB interface, and is also connected to a third control chip (606) for reading a port protocol of the external electrical appliance connected to the third interface (40) and adjusting electrical characteristics of the third interface (40).

6. The multifunctional emergency starting power for motor vehicles according to claim 5, wherein the third control chip (606) adopts the RZC7514 chip, the DM pin and the DP pin of the RZC7514 chip are connected to the D+ pin and the D− pin of the third interface (40), the SEL pin of the RZC7514 chip is connected to the power pins of the third interface (40) through a resistor R13, and the power pins and ground pins of the RZC7514 chip are connected to the power pins and ground pins of the third interface (40).

7. The multifunctional emergency starting power for motor vehicles according to claim 1, wherein the cylindrical structure comprises a soft outer cylinder (11), an integrated middle cylinder (12), and an inner cylinder (13) composed of a combination of two cylinder petals; the accumulator (20) and the controller (60) are installed inside the inner cylinder (13), the middle cylinder (12) is sleeved outside the inner cylinder (13), and the outer cylinder (11) is sleeved outside the middle cylinder (12) and adjacent to the second end of the cylindrical structure.

8. The multifunctional emergency starting power for motor vehicles according to claim 7, wherein the outer cylinder (11) comprises an annular base (111), two opposing tile-shaped portions (112) extending from one end of the annular base (111) along the axis of the annular base (111), and a sealing sheet (113) located between the two tile-shaped portions (112), and configured for sealing the control switch (80) and an indicator light (90).

9. The multifunctional emergency starting power for motor vehicles according to claim 1, wherein a first end cover (15) for protecting the vacuum cleaner (70) is installed at a first end of the bracket (10), and a second end cover (14) for protecting each interface is installed at a second end of the bracket (10).

* * * * *